April 5, 1960     E. N. FLEMING     2,931,387
CONTROL APPARATUS FOR DOMESTIC WATER DISTRIBUTION SYSTEM
Filed Aug. 22, 1957
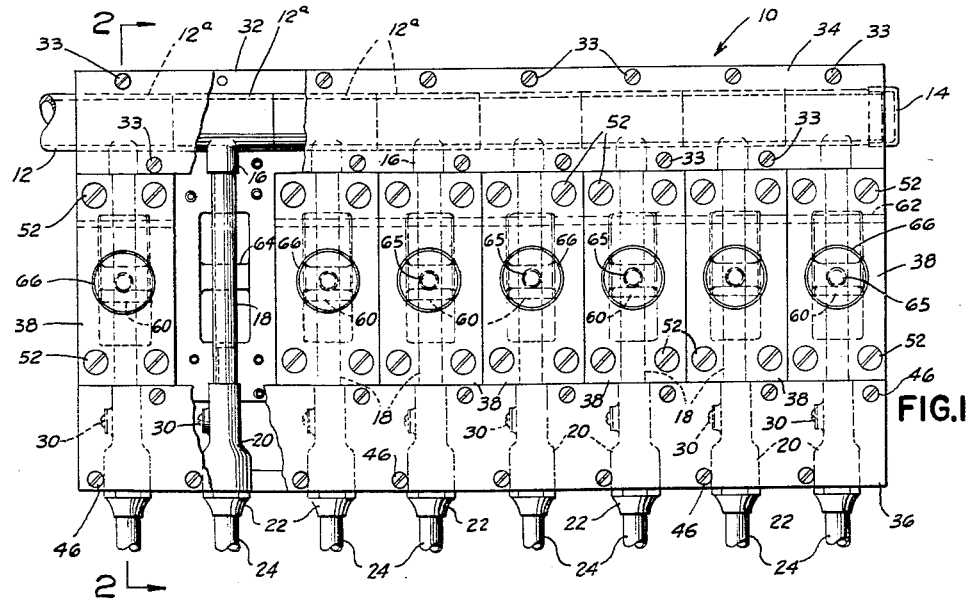
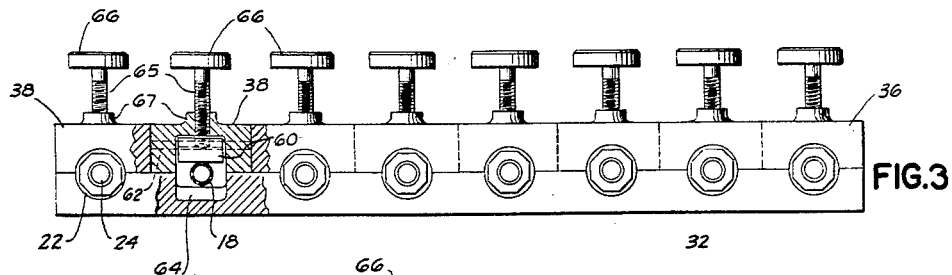
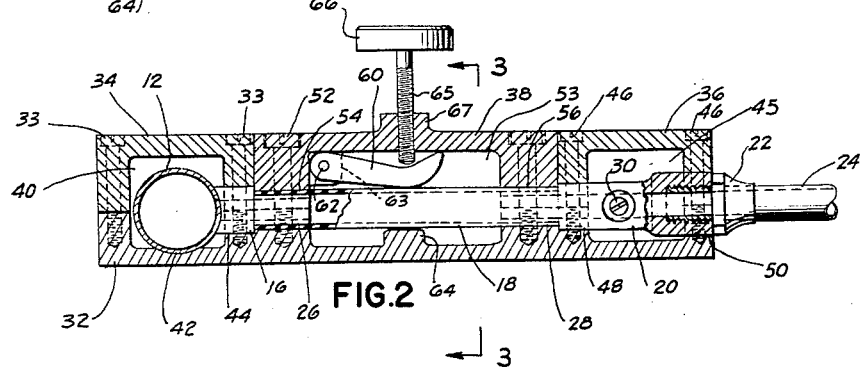
INVENTOR.
*Edward N. Fleming*
BY *Robert R. Churchill*
ATTORNEY

United States Patent Office 2,931,387
Patented Apr. 5, 1960

2,931,387

CONTROL APPARATUS FOR DOMESTIC WATER DISTRIBUTION SYSTEM

Edward N. Fleming, Gibsonia, Pa., assignor to H. H. Robertson Company, Pittsburgh, Pa., a corporation of Pennsylvania Application August 22, 1957, Serial No. 679,672

3 Claims. (Cl. 137—608)

This invention relates to control apparatus for a domestic water distribution system.

The invention has for an object to provide novel and improved control apparatus for the purpose specified for controlling the distribution of water under pressure to a plurality of service outlets in a novel manner and which is highly convenient and efficient in use.

The invention has for a further object to provide a novel and improved control apparatus of the type specified which is particularly adapted for use in a domestic water distribution system embodying plastic tube piping.

With these general objects in view and such others as may hereinafter appear, the invention consists in the control apparatus for a domestic water distribution system as hereinafter described and particularly defined in the claims at the end of this specification.

In the drawings illustrating the preferred embodiment of the invention:

Fig. 1 is a plan view of the present control apparatus for a domestic water distribution system, parts thereof being broken away to disclose the underlying structure;

Fig. 2 is a vertical sectional view taken on the line 2—2 of Fig. 1; and

Fig. 3 is a front elevation of the control apparatus shown in Fig. 1 and illustrated partly in vertical cross section as seen from the line 3—3 of Fig. 2.

In general the present invention contemplates novel water distribution control apparatus for use in a domestic water distribution system embodying a novel distribution center comprising a manifold adapted for connection to a source of water under pressure and having a plurality of outlet openings connected by individual pipe lines to individual service outlet fixtures, each outlet opening having an individual valve control unit adjacent the manifold opening for controlling the distribution and pressure of the water to its respective service outlet fixture. In the illustrated embodiment of the invention each manifold outlet is provided with a flexible tube connected between the outlet opening and its service pipe, and provision is made for adjustably compressing the flexible tube to form in effect a valve for controlling the flow of the water from the manifold to a particular service outlet fixture. In practice the flexible tube pipe connections may comprise suitable plastic tubes, and the service pipes connected between the valves and the service outlets may also comprise flexible plastic tubular material. The assembled manifold unit and connections are preferably supported in a protective housing for retaining and confining the control unit in assembled relation.

Referring now to the drawings, the present control apparatus indicated generally at 10 for use in a domestic water distribution system includes a tubular manifold 12 which may be connected at one end to a source of water under pressure and which may be provided with a plug 14 at its other end. A main supply valve, not shown, may be provided between the source of water and the manifold, and as herein shown, the tubular manifold 12 is provided with a plurality of spaced outlet openings defined by tubular extensions 16. The manifold may comprise an extended tubular member, or as shown, may comprise a plurality of individual T's 12a operatively connected together.

A short length of flexible plastic tubing 18 is connected at one end to each outlet opening 16, the other end of the tube 18 being connected to the inner end of an adapter 20, the outer end of the adapter being threaded to receive a threaded nipple 22 secured to the end of a service pipe 24 leading to an individual service outlet fixture, not shown. It will be observed that each tubular extension 16 is provided with a reduced diameter extension 26 over which one end of the flexible tubing 18 may be telescopically engaged and secured, and the adjacent end of the adapter 20 is likewise provided with a reduced diameter extension 28 to which the other end of the flexible tubing 18 is similarly engaged and secured. Each adapter 20 may also be provided with a drain screw 30 as shown.

As herein illustrated, the manifold assembly is preferably supported and confined in an elongated hollow rectangular housing which includes a base member 32, and as viewed in Fig. 2, the base member is provided with an elongated left-hand cover member 34, as similar right-hand cover member 36 and a plurality of individual intermediate cover members 38. The left-hand cover member 34 is secured to the base member 32 by screws 33 and is hollowed out, as shown, to conform to a hollowed out portion of the base member to provide a confining chamber 40 in which the manifold 12 is supported and retained, the bottom of the hollowed out portion is the base member having a concave portion 42 in which the manifold rests. The left-hand cover member 34 is further provided with a plurality of inwardly extended lateral semicircular cutouts corresponding to similar cutouts in the base member 32 providing lateral openings 44 in which the tubular outlet extensions 16 are confined. The right-hand cover member 36 is similarly hollowed out to conform to a hollowed out portion of the base member 32 providing a chamber 45 for the adapter 20. The cover member 36 is secured to the base member by screws 46. The right-hand cover member is provided with lateral semicircular cutouts in both sides conforming to corresponding cutouts in the base member providing openings 48, 50 respectively in which the adapters 20 are supported and confined as shown.

The intermediate cover members 38 of the housing fit snugly between and in flush top surface relation with the left and right-hand cover members and are secured to the base member by screws 52. The intermediate members 38 are also hollowed out to conform to a hollowed out portion of the base member forming a chamber 53 through which the flexible tube 18 is extended, and the members 38 are also provided with lateral semicircular cutouts in each side conforming to similar cutouts in the base member providing openings 54, 56 respectively in which the ends of the flexible tube 18 extending over the reduced diameter extensions 26, 28 respectively are confined. In practice the screws which secure their respective cover members 34, 36, 38 to the base member serve to clamp the elements which they confine in their assembled position so that the ends of the flexible tubes 18 are clamped in tight engagement with the tubular extensions 26, 28 as shown.

In order to control the distribution and flow of water through the individual service pipes 24, each intermediate cover member 38 is provided with a pressure arm 60 pivotally mounted on a pin 62 carried by lugs 63 extended from the member 38. The pressure arm 60 is generally curved at its free end, as shown, and is of a width sufficient to fully engage the upper surface of the flexible connecting tube 18 at an intermediate position thereof and is adapted to compress the opposed surface of the tube into engagement with the surface of a projection 64 extending upwardly from the base member 32. A screw 65 provided with an enlarged head 66 is threadedly engaged in a boss 67 of the upper wall of the intermediate cover member and is arranged to extend through the wall and engage the upper surface of the operating arm 60 to effect compression of the tube to control the flow of water therethrough.

From the above description it will be seen that the present water distribution control manifold provides a control center for a domestic water distribution system whereby the distribution and flow of water under pressure may be controlled from a single control center conveniently located for accessibility in the basement or other part of the house. It will be understood that the novel control manifold for the individual service pipes and outlet fixtures embodying a flexible tubing capable of being compressed to adjust the flow and pressure of the water to a particular outlet may comprise a plastic or other suitable compressible tubing material and that in some instances the entire system including the control manifold, housing and the service piping may comprise a plastic material if desired.

While the preferred embodiment of the invention has been herein illustrated and described, it will be understood that the invention may be embodied in other forms within the scope of the following claims.

Having thus described the invention, what is claimed is:

1. Control apparatus for a domestic water distribution system comprising a manifold connected to a source of water under pressure, said manifold having a plurality of spaced outlet openings defined by lateral tubular extensions, a plurality of adapters, each also having tubular extensions at one end and connected to service outlet pipes at the other end, a plurality of lengths of flexible tubing telescopically fitted over the tubular extensions of each outlet opening and adapter, a housing supporting and confining the manifold, adapters, and the connecting lengths of flexible tubing in assembled relation including a base member and cover members secured to the base member and arranged to clamp the manifold adapters and the connecting lengths of flexible tubing within the housing, and control means carried by the housing including a plurality of compressing members, one for each length of tubing, and means for actuating the compressing members to compress the individual lengths of flexible tubing to provide in effect a valve controlling the flow and pressure of the water from the manifold to said service pipes.

2. Control apparatus as defined in claim 1 wherein a separately detachable cover member is provided for each length of flexible tubing, each separately detachable cover member cooperating with the base member to clamp the connected ends of the flexible tubing to their respective tubular extensions and adapters.

3. Control apparatus as defined in claim 1 wherein the cover members include a longitudinally extended detachable cover member adjacent one marginal edge cooperating with the base member to clamp said tubular manifold extensions, a second longitudinally extended detachable cover member adjacent the opposite marginal edge cooperating with the base member to clamp said service outlet pipes, and a plurality of separately detachable, transversely extended cover members disposed between said longitudinally extended cover members, each transversely extended cover member cooperating with the base member to clamp the connected ends of the flexible tubing to their respective tubular extensions and adapters.

References Cited in the file of this patent

UNITED STATES PATENTS

| | | |
|---|---|---|
| 1,652,537 | Lewis | Dec. 13, 1927 |
| 1,677,453 | Jones | July 17, 1928 |
| 1,756,830 | Marshall | Apr. 29, 1930 |
| 2,565,903 | Zellweger | Aug. 28, 1951 |